US006169974B1

(12) United States Patent
Baumgartner et al.

(10) Patent No.: US 6,169,974 B1
(45) Date of Patent: Jan. 2, 2001

(54) METHOD FOR CLOSED LOOP PROCESSING OF TRANSACTIONS UTILIZING BANK CARD ASSOCIATION

(75) Inventors: James W. Baumgartner; Cynthia M. Smith, both of Park Cities, UT (US)

(73) Assignee: Paymentech, Inc., Dallas, TX (US)

( * ) Notice: Under 35 U.S.C. 154(b), the term of this patent shall be extended for 0 days.

(21) Appl. No.: 09/168,470

(22) Filed: Oct. 8, 1998

(51) Int. Cl.[7] ................................................. G06F 17/60
(52) U.S. Cl. ........................................................... 705/39
(58) Field of Search ....................... 705/39, 40; 235/380, 235/379

(56) References Cited

U.S. PATENT DOCUMENTS

| | | | |
|---|---|---|---|
| 5,621,796 | * | 4/1997 | Davis et al. ............................ 380/24 |
| 5,677,955 | * | 10/1997 | Doggett et al. ........................ 380/24 |
| 5,748,908 | * | 5/1998 | Yu ........................................ 705/44 |
| 5,875,435 | * | 2/1999 | Brown .................................... 705/39 |
| 5,963,925 | * | 10/1999 | Kolling et al. ........................ 705/40 |
| 5,963,926 | * | 10/1999 | Kumomura ............................ 705/41 |
| 5,987,132 | * | 11/1999 | Rowney ................................. 380/24 |
| 5,987,140 | * | 11/1999 | Rowney et al. ....................... 380/49 |

OTHER PUBLICATIONS

Rapp, Susan J; McCubbin, Douglas P; "Implementing a purchasing card program," TMA Journal, v17n2, pp.: 30–38, 30–38 Mar./Apr. 1997, ISSN:1080–1162, JRNL Code-:JCG.*

Buonanni, D; Swendrzynski, Bob; "Supply Distribution Systems: ATMs of Health Care," Hospital Materials Management, v20, issue12, Dec. 1, 1995.*

Heuer, Steffan; "Upping the Ante in Purchasing Cards," Bank Technology News, Jul. 1, 1998.*

"Purchasing Card Market Boasts Huge Potential," Bank Technology News, Feb. 1, 1998.*

Palmer, Richard J; Ward, Walter D; "Charge it!," Journal of Accountancy, v184, n1, Jul. 1, 1997.*

* cited by examiner

Primary Examiner—Eric W. Stamber
Assistant Examiner—Forest O Thompson, Jr.
(74) Attorney, Agent, or Firm—Sidley & Austin

(57) ABSTRACT

A procedure for tracking transactions carried out between multiple cost centers and an in-house supply facility of a business entity is carried out by setting up the supply facility to function essentially in the same manner as an independent retail merchant through the existing bank card association. Transaction information is then transferred as a batch to a merchant accounting system which transfers the information to the bank card association to the card issuer. The card issuer then provides a funds payment that is transferred through the bank card network to the merchant accounting system and finally to the merchant acquirer. The merchant acquirer, however, then transfers the funds back to the credit card issuer to cancel out the original funds transfer and thereby provide a closed loop funds transfer. Periodically, the merchant accounting system provides a comprehensive collection of the transaction information performed by the stock room to the credit card issuer who in turn generates a transaction report that is provided to the business entity for updating its general ledger. At the close of a month, the totality of transactions for the stock room of the business entity is communicated to the credit card issuer which in turn determines the amount of interchange fees it has received from the merchant acquirer and pays a corresponding amount for the interchange fees back to the merchant acquirer, thus essentially zeroing out the interchange fees in a closed loop manner.

6 Claims, 3 Drawing Sheets

METHOD FOR CLOSED LOOP PROCESSING OF TRANSACTIONS UTILIZING BANK CARD ASSOCIATION

BACKGROUND OF THE INVENTION

Bank card associations, such as MasterCard and VISA, have been established to process the enormous volume of credit card transactions that are generated across the country. The credit card associations work with credit card issuers who provide credit cards to consumers and businesses, and with merchant acquirers who establish contracts with merchants to process their credit card transactions and provide payments to the merchants. The credit card issuers extend credit to the cardholders and collect fees and interest for providing the credit card services. This overall system has been developed over many years and has evolved into a high speed, effective operation that handles a very large number of transactions which minimizes the cost per transaction, thereby making such services available on a very wide scale at a moderate cost to the users.

Large business entities typically are organized with multiple cost centers in order to monitor and control the expenses associated with each such cost center and to measure the productivity or profit of each cost center. Most business organizations require the use of extensive supplies, other than for manufacturing products, in order to perform the objectives of the business. Such supplies are typically distributed from one or more stock rooms or supply rooms located on the premises of the business entity. Although these in-house supply facilities provide merchandise and services much like retail stores, the actual operation of such facilities is generally much different from a conventional retail operation. In particular, the merchandise is purchased in bulk by the business entity and distributed as needed throughout the company, but there is no actual sale of the merchandise when it is distributed to company employees. There are typically a large number of such transactions each month, but each transaction involves a relatively small dollar amount of merchandise. Therefore, any system implemented in-house to merely track each transaction and allocate it to a particular cost center is economically impractical unless the per transaction cost is quite small in comparison to the value of each transaction. Thus, with low transaction values and high volume, it becomes very difficult for a business to economically track the in-house allocation of expenses for supplies and services. Therefore, there is a need for a method to rapidly, accurately and economically track such transactions.

SUMMARY OF THE INVENTION

An embodiment of the present invention is a method for processing transactions between specific costs centers of a business entity which has an in-house supply facility. This process utilizes a conventional bank card association that functions in conjunction with a financial entity which includes both a merchant acquirer and a credit card issuer. The first step of the method comprises generating transaction information for each transaction between the cost centers and the supply center. The transaction information includes at least data identifying the business entity, the specific cost center which initiated the transaction, the amount of the transaction and the date of the transaction. This transaction information is transmitted to a network services host computer which provides authorization data for the transactions. The transaction information is transferred from the network services host computer to a merchant accounting system, which collects such information from multiple sources, and then transfers the transaction data to a bank card association. The bank card association transfers at least a part of the transaction information to the credit card issuer, which after receipt of the transaction information, transfers transaction funds, which correspond to the transaction amounts, to the bank card association. The bank card association transfers the funds to the merchant accounting system which in turn transfers the funds to the merchant acquirer. The merchant acquirer then transfers the transaction funds to the credit card issuer, which upon receipt offsets the transaction funds previously transferred from the credit card issuer to the bank card association. The credit card issuer generates a report of the in-house business transactions and the report includes data indicating at least the transaction amount and the cost center involved in the transaction. Finally, the credit card issuer provides a transaction report in an electronic form to the business entity, which uses the report to update its general ledger and thereby allocate the costs of merchandise and services supplied internally to the appropriate cost centers.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION

Figure 1:
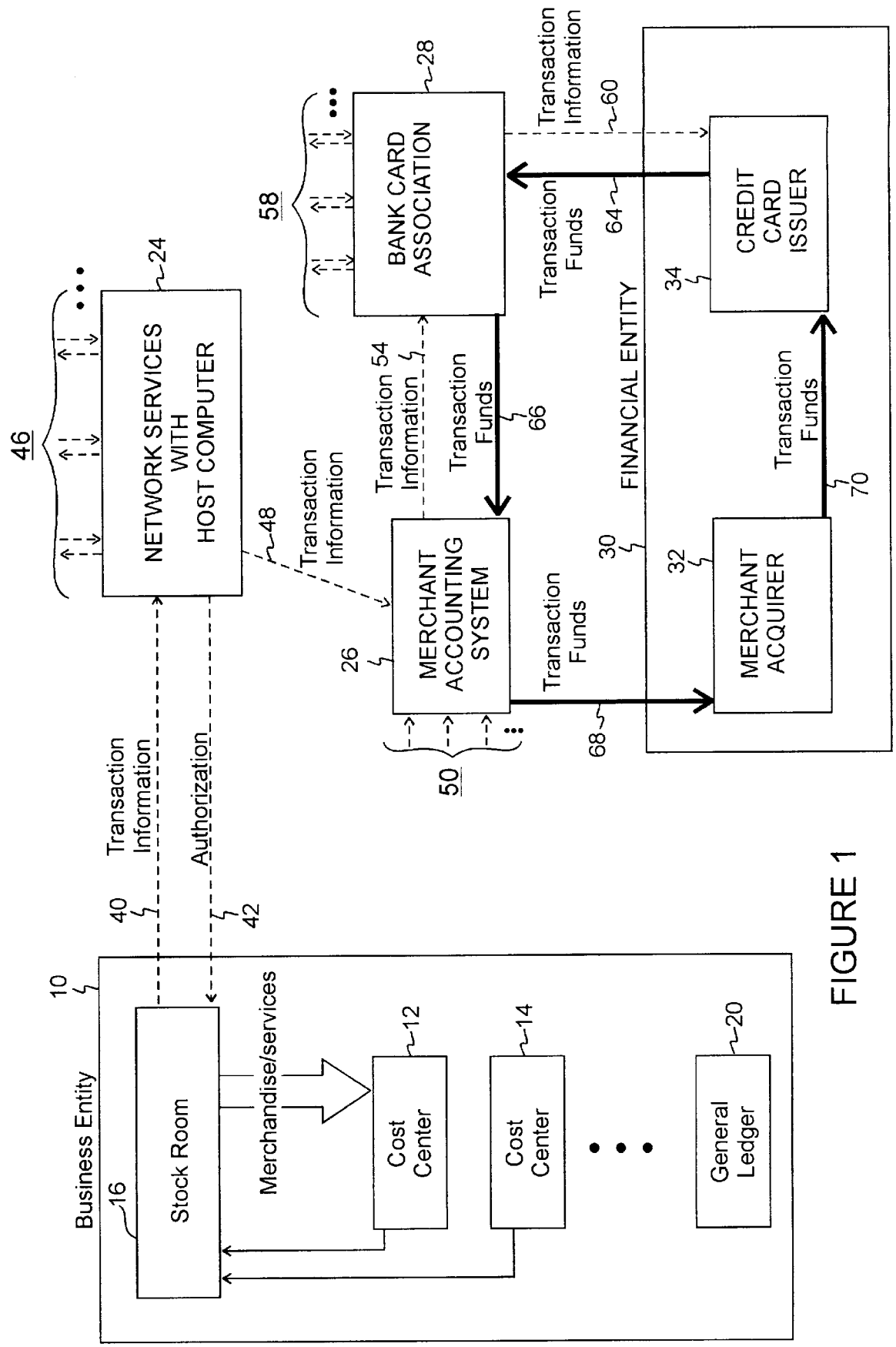
FIG. 1 is a block diagram illustrating the relevant entities involved in the present invention and showing the information flow and transaction funds flow during a short time period (a few days) after merchandise/services have been ordered at a supply facility within a business.
Figure 2:
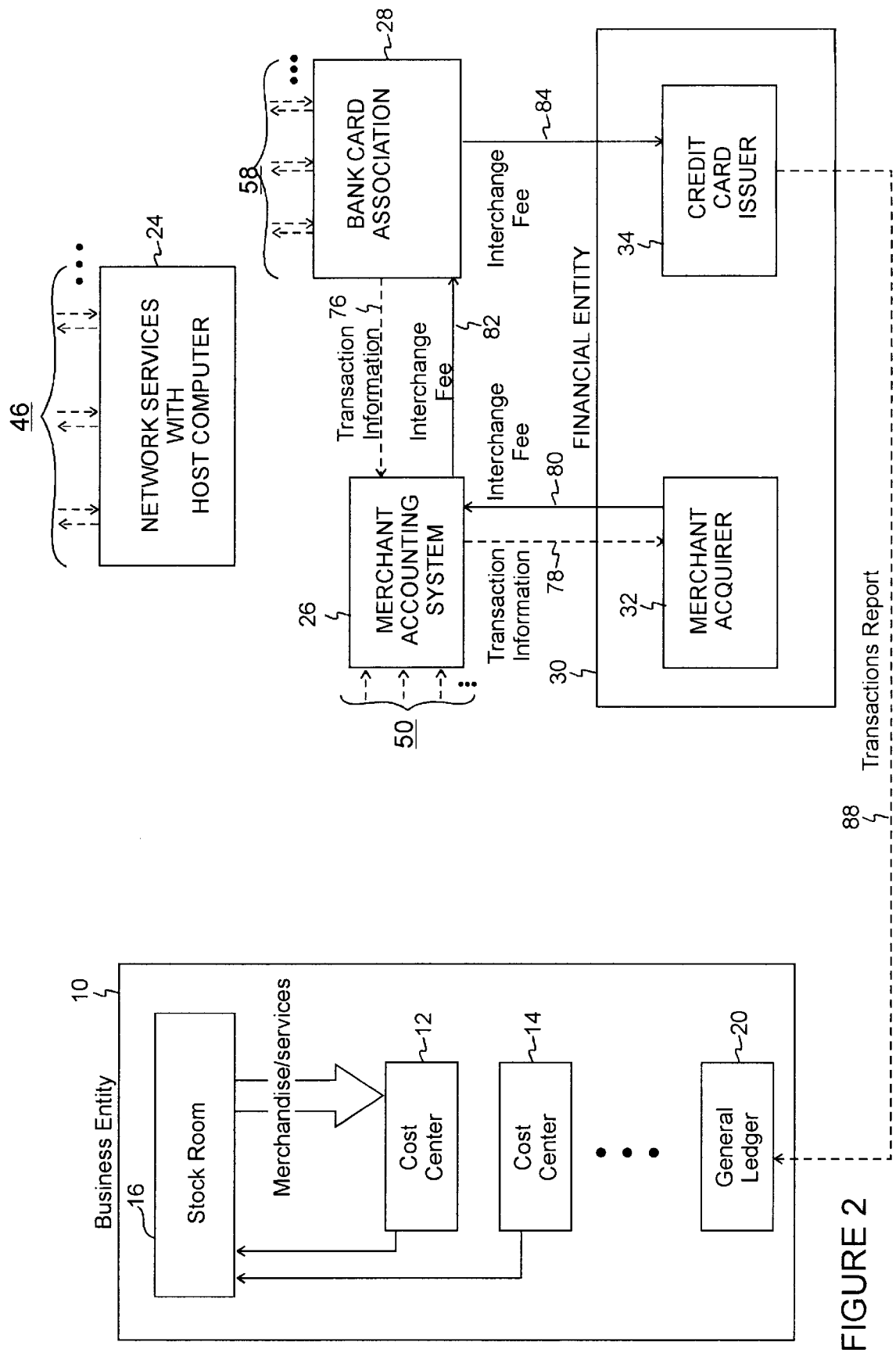
FIG. 2 is a block diagram as shown in FIG. 1 illustrating the transaction information flow and funds transfer for an interchange fee.
Figure 3:
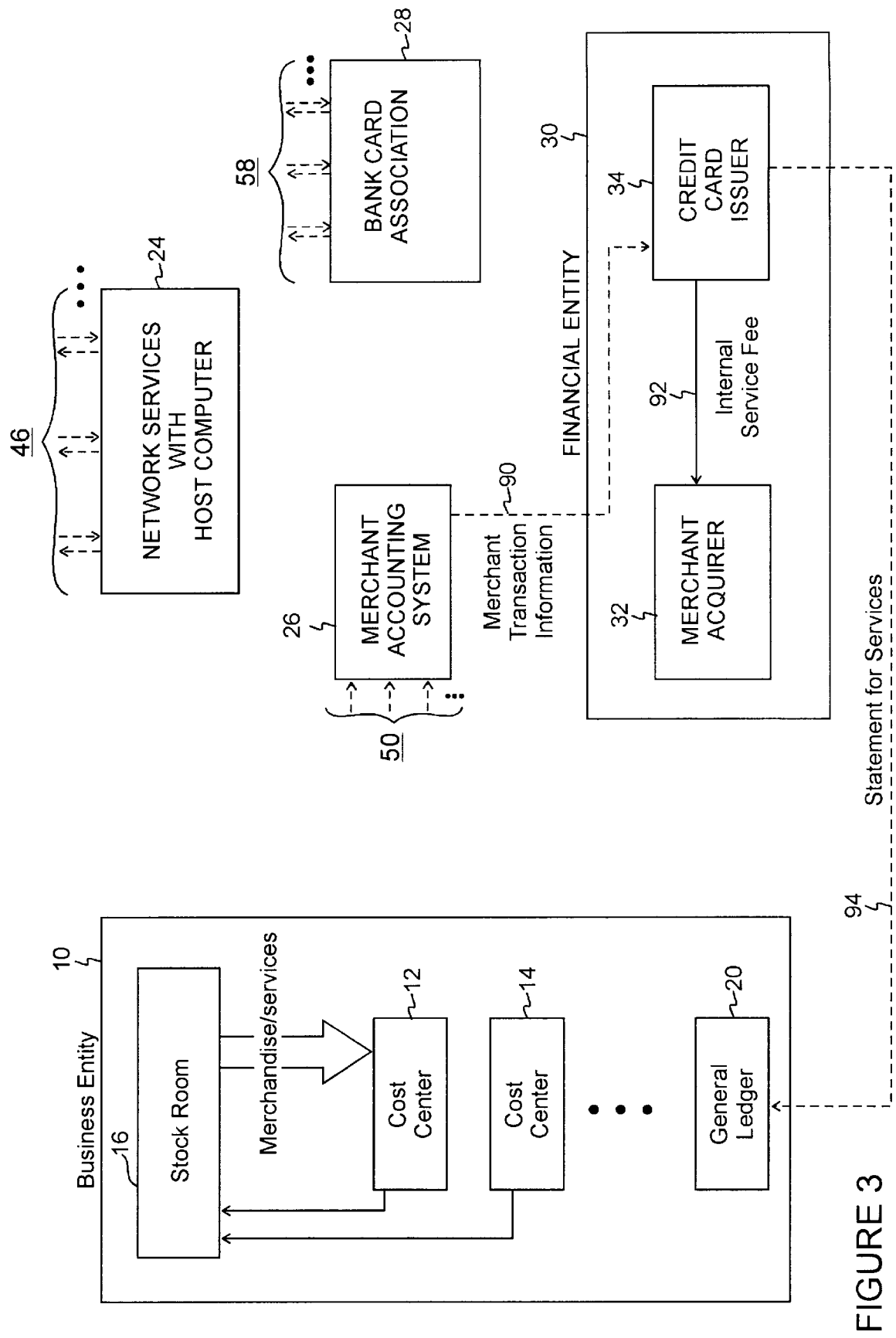
FIG. 3 is a block diagram as shown in FIG. 1 including a further sequence of information flow and funds flow at the end of a monthly billing period.

The present invention, as illustrated in FIGS. 1, 2 and 3, is a method for tracking transactions which occur between cost centers and a supply facility of a business entity by using the existing bank card association, and related processing entities, even though there is no actual sale of merchandise or services.

Referring to FIG. 1, there is shown a business entity 10 which includes cost centers 12 and 14 and a stock room 16. There may be multiple stock rooms for a business entity. The employees within the business entity are associated with various ones of the cost centers. The stock room 16 provides merchandise and services to the employees of the business entity and it is necessary that the cost of the merchandise and services be allocated to the appropriate cost center, as reflected in the business general ledger 20.

The overall system shown in FIG. 1 further includes a network services with host computer 24, merchant accounting system 26 and a bank card association 28. A financial entity 30 includes both a merchant acquirer 32 and a credit card issuer 34.

The network services with host computer 24 is a service that collects information from multiple merchants and provides authorizations for transactions. An example of such a service is Paymentech Network Services, which is provided by Paymentech Merchant Services Inc. An example of the merchant accounting system 26 is a service provided by Electronic Data Systems. An example of the bank card association 28 is the MasterCard Association.

In reference to FIGS. 1, 2 and 3, information and data transfer is represented by dashed lines while the transfer of funds from one entity to another is shown by solid lines. The funds transfer may be actually provided to banks or accounts for the described entities and may involve transfers through a clearing house (ACH).

Although the network services with host computer 24 and merchant accounting system 26 are shown as separate from the financial entity 30, they may be included in the financial entity 30, or their functionality provided by entity 30.

Referring to FIG. 1, the stockroom 16 is set up by the merchant acquirer 32 to function essentially in the same manner as a typical retail merchant. The business entity 10 is provided with purchasing cards, or with information equivalent to purchasing cards, by the credit card issuer 34 and these cards, or information, are provided to employees with different card number assignments, or identification numbers, for each of the cost centers 12 and 14. The employees of the business entity utilize the purchasing cards, or equivalent information, provided by the credit card issuer 34 to obtain merchandise and services from the stock room 16.

Whenever an employee obtains merchandise or services from the stock room 16, this process constitutes a transaction between the stock room and a cost center. The data collected for such a transaction comprises the standard information collected in a level 2 credit card transaction, which consists of the following information:

1. Amount—a 7 digit number indicating the dollar amount of the transaction
2. Action—a 12 digit code representing the type of transaction such as sale, return, prior sale or authorization only
3. Customer Reference—a 17 digit number representing a customer number or a purchase order. (With the present invention, this represents the cost center.)
4. Destination Zip Code—a 9 digit number representing the Zip Code where an order is to be shipped
5. Tax—an 8 digit number representing the amount of tax to be applied to the order (This is not relevant to the present invention since no charges are actually incurred in a transaction)
6. Address—a 20 digit optional number representing the street address of the cardholder (optional)
7. Zip—a 9 digit optional number representing the Zip Code of the cardholder (optional)
8. Authorization Date—an 8 digit number indicating the date of the transaction
9. Time—an 8 digit number indicating the time of the transaction
10. Authorization Number—a 6 digit number indicating the authorization code returned from the network services host computer 24
11. By—a 6 digit code for display only identifying the host which sent the authorization code
12. Host—a 15 digit code which comprise the actual host response message
13. Code—a 2 digit code representing the response code sent by the authorizing entity The identity of the stock room 16, and/or that of the business entity 10, is produced by a point-of-sale device or computer used to record transactions. This is the same as merchant identification.

Not all of the above-identified data is required for a transaction in accordance with the present invention. At a minimum there is needed the following:

1. stock room (merchant) identification
2. cost center identification
3. amount of transaction
4. date of transaction
5. batch identification
6. card holder identification (card or account number)

The authorization number (supplied by computer 24) can be provided on a transaction-by-transaction basis or can be provided for each transaction when a batch of transaction data is provided at the end of a day to the network services host computer 24.

Transaction information 40 is transmitted from the stock room 16, either as individual transmissions or as a batch transfer, to the network services host computer 24, which generates authorizations 42. As a batch, this is done late in the day of the transaction, which is termed day 1. The transaction authorizations can be provided in conjunction with the batch transfer. The network services host computer 24 further receives similar information from other merchants, as indicated by the reference number 46. Batch collection from merchants is typically done at the end of day 1. After the batch information has been collected from the multiple merchants, it is transferred on day 2 as transaction information 48 to the merchant accounting system 26. The merchant accounting system 26 receives such information from multiple network services, as indicated by the reference numeral 50.

Typically on day 2 the merchant accounting system 26 transfers the received information as transaction information 54 to the bank card association 28. Similar information is received from other merchant accounting systems, as represented by reference numeral 58.

The bank card association 28 supplies transaction information 60, corresponding to the transaction information 54, to the credit card issuer 34, which in turn transfers transaction funds 64 to the account for the bank card association 28. The transaction funds 64 correspond to the amounts of the transactions indicated in the transaction information 40 supplied by the stock room 16. This transfer of funds 64 typically represents the funds for a batch of the transactions indicated by the transaction information 40. The bank card association 28 transfers transaction finds 66, which correspond essentially to the funds 64, to the merchant accounting system 26. The transactions 64 and 66 occur very close in time (on the same day) so that the association 28 has little or no float for the funds.

The merchant accounting system 26 in turn transfers corresponding funds 68 to the merchant acquirer 32. The transfer of the funds 64, 66 and 68 typically occurs during day 3.

On day 4, the merchant acquirer 32 transfers transaction finds 70 to the credit card issuer 34. The funds 70 correspond to the funds 68 previously received by the merchant acquirer 32. Upon receipt of the funds 70, the credit card issuer 34 balances out the previous transfer of funds 64 and thus closes the loop on the funds transfer related to the dollar amounts of the transactions at the stock room 16. Note that no finds are ever provided to the business entity 10 or the stock room 16, as with conventional credit card processing and payment, since the merchandise and/or services have previously been purchased and paid for by the business entity 10 itself. The various finds transfers have been performed because these are the standard procedures for processing of credit card information through the bank card association 28. This closed loop processing can be performed by the financial entity 30 because it comprises both the merchant acquirer 32 and the credit card issuer 34.

A further aspect related to the present invention is the payment of processing fees termed "interchange" and "assessments" associated with the use of the bank card association 28. This is shown in FIG. 2. The interchange fee and assessments are a percentage fee based on the dollar amount of the transactions and may also include a per transaction fee. This is termed the "interchange fee" herein. Upon receipt of the transaction information 54 by the bank card association 28, transaction information 76 is provided by the bank card 28 to the merchant accounting system 26, which in turn provides corresponding transaction information 78 to the merchant acquirer 32. In response to receipt of the transaction information 78, an interchange fee 80 is paid by the merchant acquirer to the merchant accounting system 26. The merchant accounting system 26 in turn pays a corresponding interchange fee 82 to the bank card association 28, which in turn pays a corresponding interchange fee 84 to the credit card issuer 34. The payment of interchange fees 80, 82 and 84 typically occur on day 3 of the transaction processing. As a result of these transfers, the merchant acquirer 32 has paid the interchange fee for each of the multiple transactions and this interchange fee sum is held by the credit card issuer 34.

On day 4 the credit card issuer 34 generates a transaction report 88 which is provided to the business entity 10 for updating its general ledger 20. This report includes for each transaction at least data indicating the transaction amount and the cost center involved in the transaction. The report 88 is supplied in an electronic format that provides for prompt and automatic updating of the general ledger 20 of the business entity 10. The transactions report 88 does not includes any funds transfer, but does provide all of the information necessary for the business entity 10 to relate all cost incurred by the centers 12 and 14 for the merchandise and supplies they have obtained from the stock room 16.

Typical information in a transaction report for each transaction, with the field size stated in characters in parenthesis, is:

1. Run Date (8)
2. Company ID (7)
3. Account Number (16)
4. Merchant Name (25)
5. Merchant City (12)
6. Merchant State (3)
7 Merchant Category Code (4)
8. Transaction Date (8)
9. Post Date (8)
10. Transaction Amount (16)
11. Employee Company ID (5)
12. Employee General Ledger Sub. Account (16)
13. Employee General Ledger Cost Center (10)
14. Account Code 1 (50)
15. Account Code 2 (50)
16. Account Code 3 (50)
17. Account Code 4 (50)
18. Account Code 5 (50)
19. Account Code 6 (50)
20. Account Code 7 (50)
21. Account Code 8 (50)
22. Debit Count (11)
23. Debit Total (16)
24. Credit Count (11)
25. Credit Total (16)
26. Record Count (11)

The company noted above is the business entity 10 and the merchant is the stock room 16.

At the end of each month, a final set of transactions are carried out by certain ones of the entities shown in FIG. 1. This month end set of transactions are illustrated in FIG. 3. At the month end, the merchant accounting system 26 provides a comprehensive list of all transactions for a particular merchant, that is, the stock room 16, as merchant transaction information 90 that is supplied to the credit card issuer 34. Upon receipt of this information, the credit card issuer 34 ascertains the total amount of interchange fees which have been earlier paid by the merchant acquirer 32 and includes this amount in an internal service fee 92 which is transferred to the merchant acquirer 32. The fee 92 includes a service fee for payment of the services provided by the merchant acquirer 32. As a result of this action, the interchange fees are essentially zeroed out for all of the transactions made through the stock room 16 and processed through the bank card association 28.

The credit card issuer 34 charges transaction fees for generating the transactions report 88, which report is provided a number of times throughout the month to the business entity 10. This charge is a statement for services 94 which is transmitted to the business entity 10 for payment to the credit card issuer 34.

An example of the funds and fees for a single transaction is provided as follows for a cost center which obtains $100.00 in merchandise from the stock room 16. The amount of the interchange fees 80, 82, 84 and 92 may not be the same because of charges applied by the particular entities involved. An example of such funds and fees for one transaction is as follows:

Transaction Funds 64—$100.00
Transaction Funds 66—$100.00
Transaction Funds 68—$100.00
Transaction Funds 70—$100.00
Interchange Fee 80—$2.10
Interchange Fee 82—$2.10
Interchange Fee 84—$2.10
Service Fee 92—$2.60
Fees for Service 94—$1.00

Although it would appear that the transfer of funds described herein would not be necessary for producing the result of tracking transactions by the stock room 16, it has been determined that the use of the existing credit card association 28 and associated processing entities, such as the network services host computer 24 and merchant accounting system 26, can be used in an economical fashion, for producing the information required to update the general ledger 20 of the business entity 10. The essential net cancellation of the transferred funds for both the purchase price amounts and the interchange fees, results in the ability of the credit card issuer 34 to charge a relatively low per transaction fee to the business entity 10 that is less than what would be incurred by the business entity 10 itself for internally tracking the stock room transactions.

Although one embodiment of the invention has been illustrated in the accompanying drawings and described in the foregoing Detailed Description, it will be understood that the invention is not limited to the embodiment disclosed, but is capable of numerous rearrangements, modifications and substitutions without departing from the scope of the invention.

What is claimed is:

1. A computer-implemented method for processing transactions between specific cost centers and an in-house supply facility of a business entity utilizing a bank card association functioning in conjunction with a financial entity's computerized processor which financial entity has both a merchant acquirer and a credit card issuer, the method comprising the steps of:

generating transaction information for each transaction between said cost centers and said supply facility, said transaction information including at least data identifying the business entity cost center which initiated the transaction, the amount of the transaction, and the date of the transaction, transmitting said transaction information to a network services host computer which provides authorization data for said transactions, transferring said transaction information from said network services host computer to a merchant accounting system, transferring said transaction information from said merchant accounting system to said bank card association, transferring at least a part of said transaction information from said bank card association to said credit card issuer, after receipt of said transaction information by said credit card issuer, transferring transaction funds, which correspond to said transaction amounts transferred from said credit card issuer to said bank card association, transferring said transaction funds from said bank card association to said merchant accounting system, transferring said transaction funds from said merchant accounting system to said merchant acquirer, transferring said transaction funds from said merchant acquirer to said credit card issuer to offset said transaction funds previously transferred from said credit card issuer to said back card association, producing a report of said transactions by said credit card issuer, said report including for each said transaction at least data indicating the transaction amount and the cost center involved in the transaction, and providing said transaction report in an electronic form to said business entity.

2. A method for processing transactions as recited in claim 1 including the steps of:

generating an interchange fee amount, which is associated with the processing related to said transactions performed at said in-house supply facility, by said bank card association, transferring a least a part of said transaction information from said bank card association, together with said interchange fee amount, to said merchant accounting system, transferring said transaction information and interchange fee amount received by said merchant accounting system to said merchant acquirer, transferring interchange fees corresponding to the interchange fee amount from said merchant acquirer to said merchant accounting system, transferring said interchange fees from said merchant accounting system to said bank card association, transferring said interchange fees from said bank card association to said card issuer, and transferring said interchange fees from said card issuer to said merchant acquirer to cancel the previous transfer of interchange fees by said merchant acquirer.

3. A method for processing transactions as recited in claim 2 wherein said step of transferring said interchange fees from said card issuer to said merchant acquirer is performed at the end of a monthly cycle for all interchange fees transferred during the monthly period to the card issuer.

4. A computer-implemented method for processing transactions between specific cost centers and an in-house supply facility of a business entity utilizing a bank card association functioning in conjunction with a financial entity's computerized processor which financial entity has both a merchant acquirer and a credit card issuer, wherein information related to the transactions is communicated to the bank card association, the method comprising the steps of:

receiving transaction information by said credit card issuer from said bank card association, said transaction information relating to said transactions and including at least data identifying the business entity cost center which initiated a transaction, the amount of each transaction, and the date of each transaction, after receipt of said transaction information by said credit card issuer, transferring transaction funds, which correspond to said transaction amounts, to said bank card association, receiving said transaction funds, which have been transferred through said bank card association, by said merchant acquirer, transferring said transaction funds from said merchant acquirer to said credit card issuer to offset said transaction funds previously transferred from said credit card issuer to said bank card association, producing a report of said transactions by said credit card issuer, said report including for each said transaction at least data indicating the transaction amount and the cost center involved in the transaction, and providing said transaction report in an electronic form to said business entity.

5. A method for processing transactions as recited in claim 4 including the steps of:

receiving by said merchant acquirer from said merchant accounting system transaction information and an interchange fee amount, which is associated with the processing by said bank card association resulting from said transactions performed at said in-house supply facility transferring interchange fees corresponding to the interchange fee amount from said merchant acquirer to said merchant accounting system, receiving said interchange fees from said bank card association by said card issuer, and transferring said interchange fees from said card issuer to said merchant acquirer to substantially cancel the previous transfer of interchange fees made by said merchant acquirer.

6. A method for processing transactions as recited in claim 5 wherein said step of transferring said interchange fees from said card issuer to said merchant acquirer is performed at the end of a monthly cycle for all interchange fees transferred during the monthly period to the card issuer.

* * * * *